(12) United States Patent
Hamaguchi et al.

(10) Patent No.: US 8,451,709 B2
(45) Date of Patent: May 28, 2013

(54) RADIO COMMUNICATION DEVICE

(75) Inventors: Yasuhiro Hamaguchi, Chiba (JP);
Shimpei To, Chiba (JP); Hideo Nanba,
Chiba (JP); Seiichi Sampei, Osaka (JP);
Hiroshi Harada, Tokyo (JP); Masafumi Moriyama, Tokyo (JP)

(73) Assignees: Sharp Kabushiki Kaisha, Osaka-Shi
(JP); Osaka University, Suita-Shi (JP);
National Institute of Information and Communications Technology,
Koganei-Shi (JP)

( * ) Notice: Subject to any disclaimer, the term of this patent is extended or adjusted under 35 U.S.C. 154(b) by 347 days.

(21) Appl. No.: 11/795,291

(22) PCT Filed: Jan. 16, 2006

(86) PCT No.: PCT/JP2006/000421
§ 371 (c)(1),
(2), (4) Date: Jul. 16, 2007

(87) PCT Pub. No.: WO2006/075732
PCT Pub. Date: Jul. 20, 2006

(65) Prior Publication Data
US 2008/0112309 A1    May 15, 2008

(30) Foreign Application Priority Data
Jan. 17, 2005    (JP) .................. 2005-009407

(51) Int. Cl.
*H04J 11/00*    (2006.01)
*H04J 3/06*    (2006.01)

(52) U.S. Cl.
USPC .......................... 370/208; 370/509

(58) Field of Classification Search
USPC ................... 370/208, 342, 503, 509
See application file for complete search history.

(56) References Cited

U.S. PATENT DOCUMENTS

| | | | |
|---|---|---|---|
| 5,307,376 A | 4/1994 | Castelain et al. | |
| 5,886,987 A | 3/1999 | Yoshida et al. | |
| 6,359,864 B1 | 3/2002 | Yoshida et al. | |
| 7,406,130 B2 * | 7/2008 | Huang et al. | 375/267 |
| 7,436,757 B1 * | 10/2008 | Wilson et al. | 370/203 |
| 2001/0053143 A1 * | 12/2001 | Li et al. | 370/344 |
| 2002/0012333 A1 | 1/2002 | Yoshida et al. | |
| 2002/0122381 A1 * | 9/2002 | Wu et al. | 370/208 |
| 2003/0076908 A1 * | 4/2003 | Huang et al. | 375/350 |

(Continued)

FOREIGN PATENT DOCUMENTS

| | | |
|---|---|---|
| JP | 5-75568 A | 3/1993 |
| JP | 10-101007 A | 4/1998 |

(Continued)

*Primary Examiner* — Andrew Lee
(74) *Attorney, Agent, or Firm* — Birch, Stewart, Kolasch & Birch, LLP

(57) ABSTRACT

The invention provides precise estimation of a channel response and correct demodulation of an information signal even in the circumstance of being likely suffering interference. The invention includes an error correcting code unit 1, an S/P converting unit 2, a mapping unit 3, an IDFT (Inverse Discrete Fourier Transform) unit (IFFT: Inverse Fast Fourier Transform can be used) 4, a P/S converting unit 5, a GI (Guard Interval) inserting unit 6, preamble (A, B0, B1) storage selecting units 11-a and 11-b, switch units 12-a and 12-b, D/A converting units 13-a and 13-b, radio units 14-a and 14-b and antenna units 15-a and 15-b.

23 Claims, 13 Drawing Sheets

U.S. PATENT DOCUMENTS

| | | |
|---|---|---|
| 2004/0091057 A1 | 5/2004 | Yoshida |
| 2004/0105512 A1* | 6/2004 | Priotti .......................... 375/340 |
| 2004/0116077 A1 | 6/2004 | Lee et al. |
| 2004/0235421 A1* | 11/2004 | Matsuoka et al. ........... 455/63.4 |
| 2006/0023772 A1* | 2/2006 | Mudulodu et al. ............ 375/144 |
| 2006/0120467 A1* | 6/2006 | Miyoshi et al. ............... 375/260 |
| 2006/0140303 A1* | 6/2006 | Egashira et al. .............. 375/299 |
| 2006/0184862 A1* | 8/2006 | Kim et al. ..................... 714/784 |
| 2006/0209765 A1* | 9/2006 | Ll et al. ......................... 370/334 |
| 2007/0014376 A1* | 1/2007 | Huang et al. .................. 375/260 |
| 2007/0133393 A1* | 6/2007 | Bocquet ........................ 370/210 |
| 2007/0171960 A1* | 7/2007 | Zhang et al. .................. 375/140 |
| 2007/0195865 A1* | 8/2007 | Joetten et al. ................. 375/148 |
| 2008/0317158 A1* | 12/2008 | Ketchum et al. .............. 375/267 |
| 2009/0296861 A1* | 12/2009 | Sampath ....................... 375/340 |
| 2012/0127886 A1* | 5/2012 | Kim et al. ..................... 370/252 |

FOREIGN PATENT DOCUMENTS

| | | |
|---|---|---|
| JP | 10-190537 A | 7/1998 |
| JP | 2002-101007 A | 4/2002 |
| JP | 2002-261670 A | 9/2002 |
| JP | 2003-18054 A | 1/2003 |
| JP | 2003-32217 A | 1/2003 |
| JP | 2003-124854 A | 4/2003 |
| JP | 2003-283441 A | 10/2003 |
| JP | 2004-88767 A | 3/2004 |
| JP | 2004-208254 A | 7/2004 |

* cited by examiner

RADIO COMMUNICATION DEVICE

TECHNICAL FIELD

The present invention relates to a radio communication device and particularly relates to a radio communication technique that enables to precisely estimate a channel response even in the circumstance of strong influences of interference waves coming from adjacent cells and to correctly demodulate an information signal.

BACKGROUND ART

In recent years, many more users demand fast data transmission in a radio communication system as the volume of communication increases. The multicarrier transmission represented by OFDM (Orthogonal Frequency Division Multiplexing) gets attention as a way of communication to realize the fast and high-volume data transmission. The OFDM, which is used in IEEE 802.11a being a radio system of a 5 GHz-band or digital terrestrial broadcast, provides for simultaneous communication by arranging tens to thousands of carriers in a minimum frequency interval that does not induce interference theoretically. Generally in OFDM, these carriers are referred to as subcarriers which are digitally modulated with PSK, QAM or the like for communication. It is known that OFDM and error correction are combined to obtain strong tolerance to frequency selective fading.

The patent literature 1 discloses a configuration example of a receiving device used in a communication system using the above OFDM. FIG. 13 is a diagram showing a device configuration example of a receiver illustrated in the patent literature 1. As shown in FIG. 13, the receiver proposed in the patent literature 1 is configured to include an antenna unit 1000, a GI (Guard Interval) removing unit 1001, an FFT unit 1002, demodulating units 1003-1 to -N, a P/S (Parallel to Serial) converting unit 1004, a selecting unit 1005, switches 1006-1 to -N, an IFFT unit 1007, a delay profile estimating unit 1008 and an FFT unit 1009.

A guard interval is first removed in the GI removing unit 1001 from a received signal that has been received in the antenna unit 1000 of the receiver shown in FIG. 13, and then the signal is converted from a time domain signal into a frequency domain signal in the FFT unit 1002. An information signal of each subcarrier obtained in the FFT unit 1002 as described above is transmitted to the demodulating units 1003-1 to -N for demodulation. Generally in a broadcasting system, a wireless LAN system and other systems, a known pilot signal to estimate a channel response is contained in a symbol or in a packet in addition to an information signal. Such a pilot signal is selected in the selecting unit 1005 and transmitted to the IFFT unit 1007 via the switches 1006-1 to -N.

The pilot signal transmitted to the IFFT unit 1007 is converted from a frequency domain signal into a time domain signal and a delay profile of a channel response is estimated in the delay profile estimating unit 1008. Then, the delay profile of the channel response estimated from the known pilot signal as described above is converted from a time domain signal into a frequency domain signal in the FFT unit 1009. The processing enables to seek a channel response in frequency domain.

The channel response in frequency domain obtained by the above processing is transmitted to the demodulating unit 1003-1 to -N to which an information signal has been transmitted, for use in compensation of the channel response, thereby enabling demodulation by compensating for influence of multipath fading and accordingly enabling to correctly demodulate an information signal.

[Patent Literature 1] JP Patent Publication (Kokai) No. 2003-32217 (2003)

The above prior art enables to estimate variance of a channel response for an information signal and compensate for influence of the variance. However, the art has a problem in that influence of interference waves coming from adjacent cells significantly degrades the accuracy of the estimation processing of a channel response in the circumstance of another OFDM system nearby using the same frequency band, or in the circumstance of a terminal being around a cell edge in an OFDM cellular system in which all cells use the same frequency band; as a result, an information signal cannot be demodulated correctly.

The art has another problem in that if a base station specific code is used in an OFDM symbol for estimating a channel response, to identify the base station in a cellular system, the base station specific code needs to be detected to estimate the channel response. This is problematic in that a usual correlation method in a frequency domain does not correctly work in the environment with strong frequency selective fading.

Similarly, in the case that a transmitting device implements a transmit diversity technique using a plurality of transmitting antennas, codes to estimate channel responses use the same code. That is, a technique has not been disclosed for both estimating channel responses and identifying antennas, using the same OFDM symbol.

It is an object of the present invention to precisely estimate a channel response and correctly demodulate an information signal even in the above circumstances.

DISCLOSURE OF THE INVENTION

In a radio communication technique according to the present invention, a transmitting device simultaneously transmits OFDM symbols for estimating channel responses, modulated with different codes for transmitting antennas, while a receiver converts the received OFDM symbols for estimating channel responses into frequency domain data, selects the codes used by the transmitting device for making a complex conjugate, and multiplies the obtained frequency domain data by the conjugate to calculate a frequency response of the channel response. Then, the signal is converted into a time domain signal to calculate a delay profile of the channel response. Additionally, the calculated delay profile is multiplied by an appropriate time window and again converted into frequency domain data, thereby allowing for estimating a highly accurate a channel response in frequency domain with reduced influence of interference, as well as enabling to identify antennas.

The estimating way of a channel response for each antenna and the identifying way of antennas are applied to a base station in a cellular system, thereby enabling to identify a base station and to highly accurately estimate a frequency response of a signal transmitted from each base station.

In the environment to receive a plurality of signals, a replica is created for an OFDM signal for estimating a channel response, which has resulted in an interferential signal, and is subtracted from a received signal. This improves the accuracy in estimating a channel response in frequency domain of a desired signal.

The radio communication technique according to the present invention applies the above antenna identification technique to select a transmitting antenna in transmit diversity if a transmitting device comprises a plurality of antennas.

That is, a symbol to estimate a channel response using different codes for the antennas is transmitted and transmit diversity is performed to switch to a transmitting antenna. If a result of seeking a delay profile using a pre-determined code exceeds a threshold of power, it is determined that an antenna using such a code is used as a transmitting antenna. Similarly, a receiving side estimates the number of transmitting antennas in a MIMO system.

As described in the above, according to the present invention, an OFDM symbol to estimate channel responses is received that has been modulated with different codes for transmitting antennas, converted into a frequency domain signal, multiplied by complex conjugate signals of the codes used in a transmitting device, and converted into a time domain signal to calculate a delay profile. Then, the obtained delay profile is multiplied by an appropriate time window and again converted into a frequency domain signal, thereby enabling to calculate a highly accurate frequency response of a channel response. Additionally, the receiving device selects a code for the multiplication, thereby enabling simultaneous identification of a transmitting antenna.

Further, the highly accurately calculating way of frequency responses for antennas and the identifying way of a transmitting antenna are applied to a cellular system, thereby enabling to identify base stations and estimate channel responses.

Furthermore, a replica is created for an OFDM symbol for estimating a channel response, which has resulted in an interference wave, and is subtracted from a received signal, improving estimating institution of channel responses.

In a transmit diversity system, it is possible to select or switch a transmitting antenna.

In the MIMO system, it is possible to estimate the number of transmitting antennas used in a transmitting side, so that the number of transmitting antennas does not need to be notified on a communication protocol, thereby improving throughput in an entire system.

Figure 1:
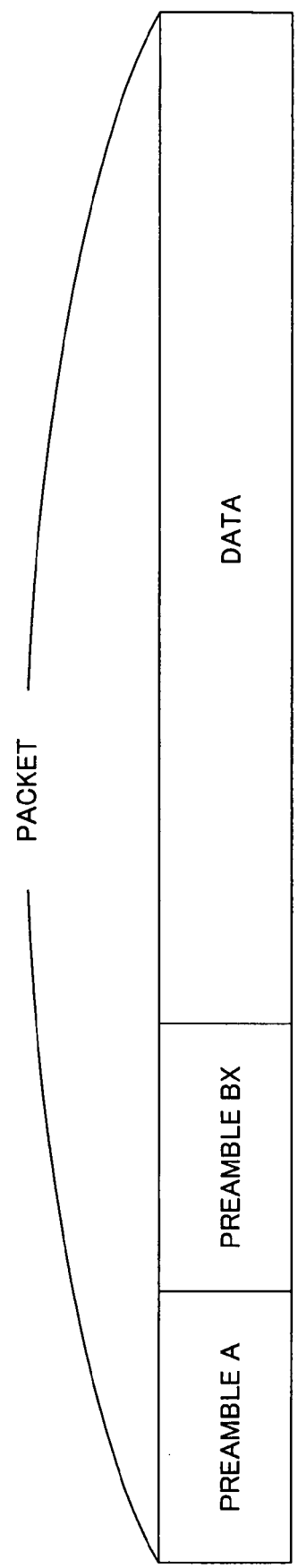
FIG. 1 is a diagram showing a configuration example of a packet used in embodiments of the present invention.

DESCRIPTION OF SYMBOLS 1 error correcting code unit
2 S/P converting unit
3 mapping unit
4 IDFT unit
5 P/S converting unit
6 GI (Guard Interval) inserting unit
11-$a$, 11-$b$ preamble (A, B0, B1) storage selecting unit
12-$a$, 12-$b$ switch unit
13-$a$, 13-$b$ D/A converting unit
14-$a$, 14-$b$ radio unit
15-$a$, 15-$b$ antenna unit

BEST MODE FOR CARRYING OUT THE INVENTION

First of all, a parameter of an OFDM (Orthogonal Frequency Division Multiplexing) signal used herein is defined as follows: the number of subcarriers used for OFDM is represented as N, the length of an OFDM symbol is represented as Tsym, and the length of a guard interval is represented as Tgi. FIG. 1 is a diagram showing a configuration example of a packet used in embodiments of the present invention. As shown in FIG. 1, a packet format according to the embodiments of the present invention contains a preamble A, a preamble BX and data. The preamble A is used for OFDM symbol synchronization or frequency synchronization. The preamble BX is mainly used to estimate a channel response. A time waveform of the preamble BX is represented as the following equation (1):

$$T(x, t) = \sum_{k=0}^{k=N-1} a_{k,x} \cos 2\pi f_k t + j b_{k,x} \sin 2\pi f_k t \tag{1}$$

The equation (1) means in view of the frequency axis that a real axis component of a subcarrier corresponding to fk is represented as ak and an imaginary axis component is represented as bk: Ck=ak+jbk (j is a unit of an imaginary number, i.e. j×j=−1). As antenna specific values, ak, x, bk and x are decided.

The present invention is characterized in that respective transmitting antennas transmit different preambles while a receiving device estimates a delay profile from each of antennas as well as estimates a channel response or identifies a transmitting antenna. If codes of code length N to generate preambles are Ckx and Cky, correlation between Ckx and Cky is represented as the following equation (2):

$$Cor = \sum_{k=0}^{N-1} C_k x \times C_k y^* \tag{2}$$

In the above equation, the symbol "*" means a complex conjugate. It is preferable to select codes such that Cor gives a smaller value, in selecting different codes for antennas.

In the following, radio communication techniques according to the embodiments of the present invention will be described.

First, a radio communication technique according to a first embodiment of the present invention will be described with reference to the drawings. The radio communication technique according to this embodiment is characterized by defining symbols used for estimating channel responses, which are transmitted simultaneously from a plurality of antennas, as different series (preambles) for the antennas, thereby separating and calculating delay profiles of signals transmitted from the antennas.

A radio communication device according to this embodiment is an example in which a transmitting device performs transmission using a plurality of antennas, and particularly, the technique according to the present invention is applied to transmit diversity.

FIG. 1 described above is also a drawing showing an example of a packet format being a target of the radio communication technique according to this embodiment. As shown in FIG. 1, a packet in this embodiment contains a preamble A, a preamble BX and data. Herein, a preamble A is used for OFDM symbol synchronization or frequency synchronization, while a preamble BX is used for antenna identification and channel response estimation. The two preambles A and BX are both predetermined signals, in which X of BX indicates that the preamble is an antenna specific preamble and preambles are labeled as B0, B1, . . . meaning different data depending on antennas.

The radio communication technique according to the first embodiment of the present invention is directed to downlink transmission, provides a plurality of antennas for a transmitting (base station) side, and relates to an antenna selection technique in performing transmitting antenna selection diversity. However, the invention should not be limited by this example and is applicable to uplink or other communications. This embodiment simultaneously transmits OFDM symbols for channel response estimation modulated with specific codes, from a plurality of transmitting antennas of a transmitting device. An example is illustrated in which a receiving side detects channel response estimating symbols transmitted from respective antennas, estimates which antenna among a plurality of antennas used in a transmitting side has transmitted a signal of the best quality (with the highest received power), and estimates a frequency response of a channel response.

Figure 2:
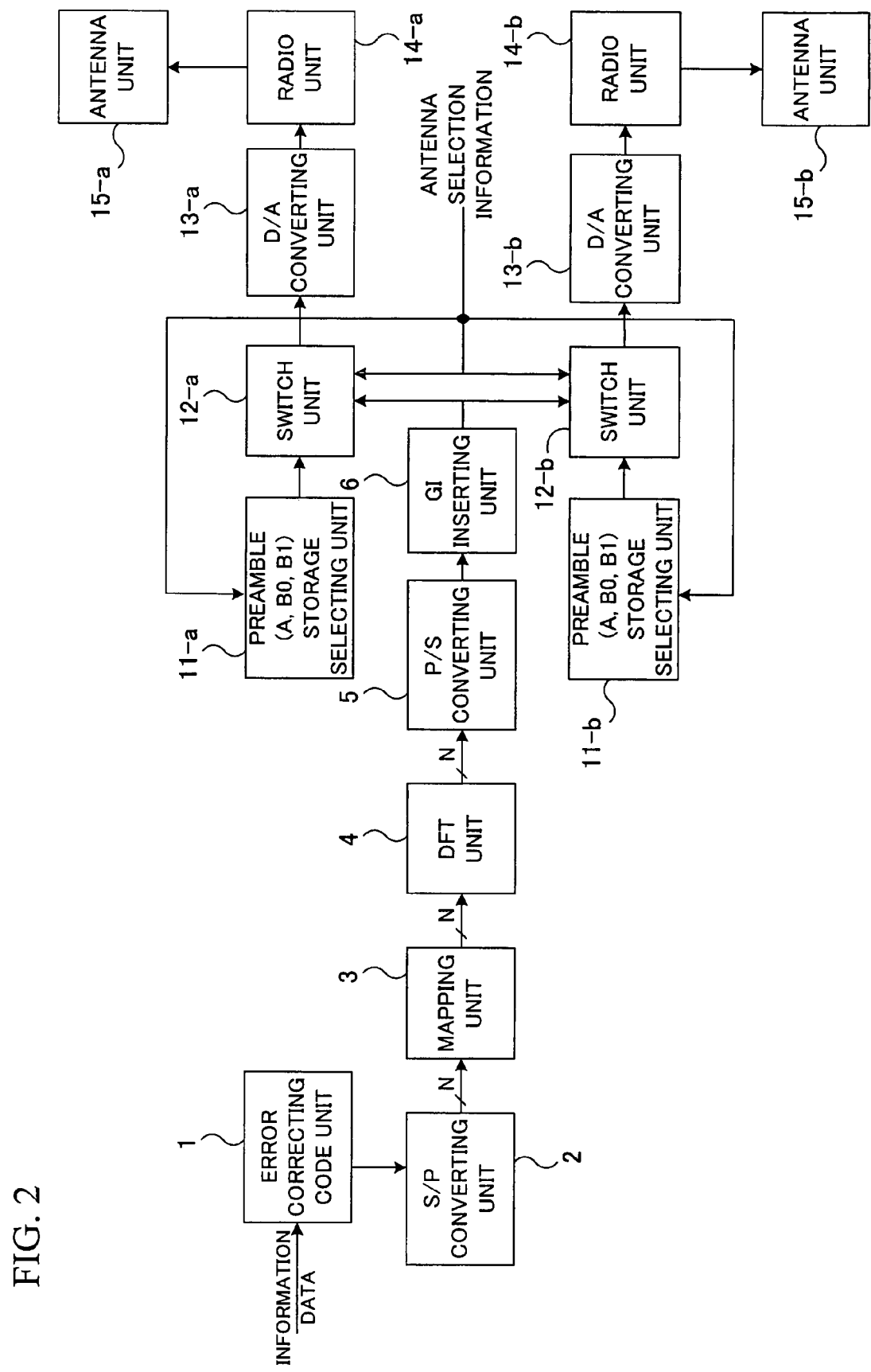
FIG. 2 is a diagram showing a configuration example of a transmitting device of a base station according to a first embodiment of the present invention.

The radio communication technique according to the first embodiment of the present invention will be described with reference to the drawings. FIG. 2 is a diagram showing a configuration example of a transmitting device of a base station according to this embodiment of the present invention. FIG. 2 shows an example in which a device is provided with two transmitting antennas, although the example does not limit the number of antennas. As shown in FIG. 2, the transmitting device of the base station according to this embodiment includes configuration corresponding to the two antennas. That is, the transmitting device includes an error correcting code unit 1, an S/P converting unit 2, a mapping unit 3, a DFT (Discrete Fourier Transform) unit 4 which may be an IFFT (Inverse Fast Fourier Transform) unit, a P/S converting unit 5, a GI (Guard Interval) inserting unit 6, preamble (A, B0, B1) storage selecting units 11-*a* and 11-*b*, switch units 12-*a* and 12-*b*, D/A converting units 13-*a* and 13-*b*, radio units 14-*a* and 14-*b*, and antenna units 15-*a* and 15-*b*.

Antenna selection information is in accordance with a result notified from a terminal being a destination of communication.

In the transmitting device of the above base station, the preamble (A, B0, B1) storage selecting unit 11 assigns a code A, a code B0 and a code B1 to carriers, which are stored in waveforms subjected to OFDM signal processing. If the antenna 15-*a* is selected according to antenna selection information, then the preamble (A, B0, B1) storage selecting unit 11-*a* outputs the preambles A, B0 and the preamble (A, B0, B1) storage selecting unit 11-*b* outputs the preamble A, B1. If the antenna 15-*b* is selected according to antenna selection information, then the preamble (A, B0, B1) storage selecting unit 11-*a* outputs the preambles A, B1 and the preamble (A, B0, B1) storage selecting unit 11-*b* outputs the preambles A, B0. That is, a preamble (A, B0, B1) storage selecting unit connected to a selected antenna outputs the preambles A, B0.

The following will describe the case that the antenna 15-*a* is selected according to antenna selection information. First, preambles are transmitted in transmitting data; that is, the switch units 12-*a* and 12-*b* first select and transmit preambles. At that time, the preamble (A, B0, B1) storage selecting unit 11-*a* outputs the preambles A and B0, while the preamble (A, B0, B1) storage selecting unit 11-*b* selects the preambles A and B1.

After the preambles have been transmitted, the switch unit 12-*a* performs switching to select data whose information data has been subjected to OFDM transmission processing from an error correction coding unit 1 to a GI (guard interval) inserting unit 6. On the other hand, the switch unit 12-*b* does not transmit data any more after the preamble transmitting.

The same transmitting operation is repeated until antenna switching is requested according to antenna information. When antenna switching is requested (the antenna 15-*b* is selected), preamble patterns for the preamble (A, B0, B1) storage selecting units 11-*a* and 11-*b* and control methods of the switch units 12-*a* and 12-*b* are replaced by each other.

Figure 3:
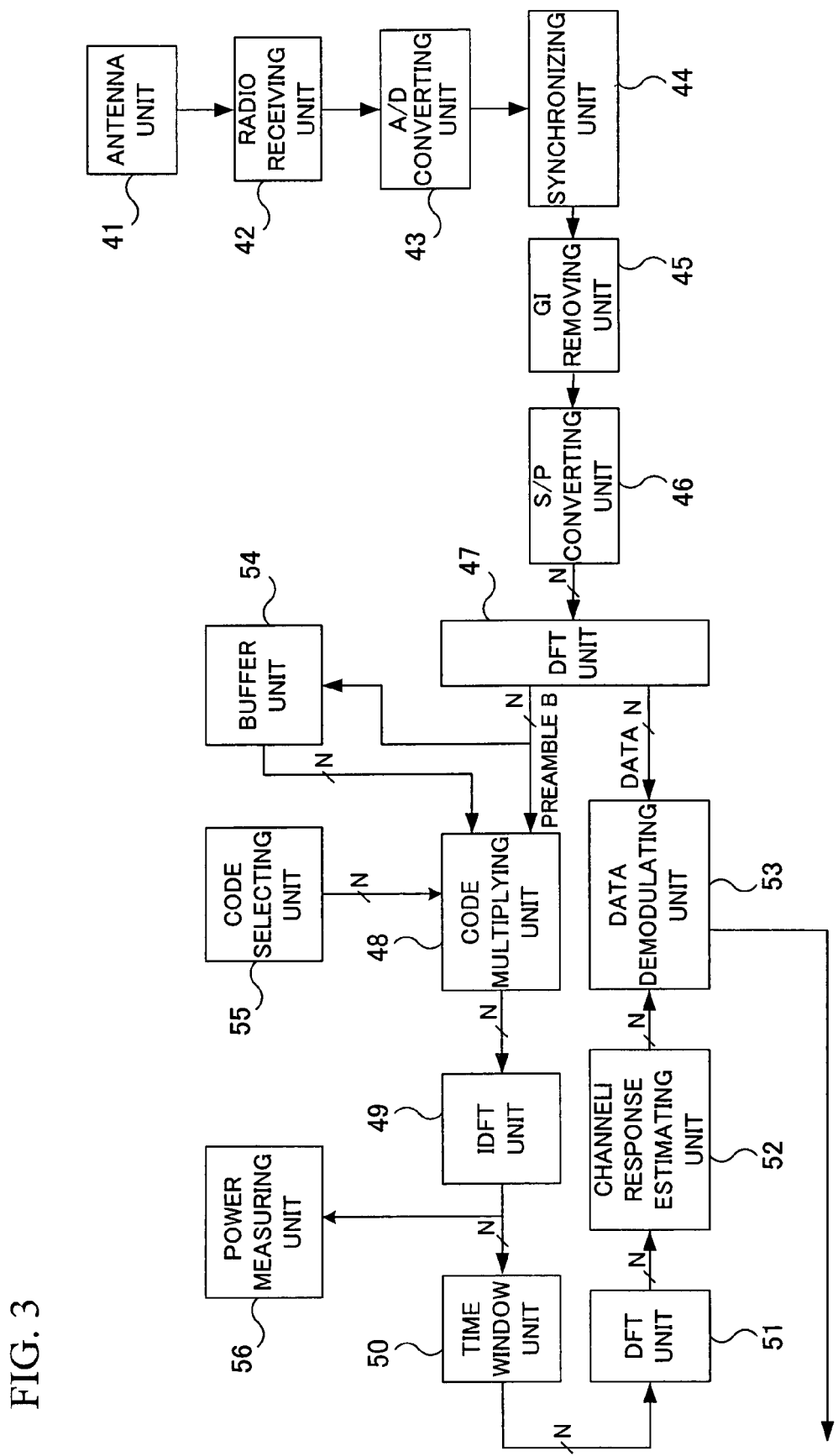
FIG. 3 is a diagram showing a configuration example of a receiving device of a terminal according to the first embodiment of the present invention.

Next, a receiving device of a terminal according to this embodiment will be described. As shown in FIG. 3, the receiving device of a terminal according to this embodiment is configured to include an antenna unit 41, a radio receiving unit 42, an A/D converting unit 43, a synchronizing unit 44, a GI removing unit 45, an S/P converting unit 46, a DFT (or FFT) unit 47, a code multiplying unit 48, an IDFT (or IFFT) unit 49, a time window (filter) unit 50, a DFT (or FFT) unit 51, a channel response estimating unit 52, a data demodulating unit 53, a buffer unit 54, a code selecting unit 55 and an power measuring unit 56.

As described above, the preambles A, B0 and A, B1 are simultaneously transmitted from different antennas in the transmitting device of the base station. In a terminal receiving device, the preambles go through different channel responses and are simultaneously received by the single antenna 41. Signals that went through different channel responses go through the radio receiving unit 42 and the A/D converting unit 43 and are inputted to the synchronizing unit 44. The synchronizing unit 44 uses the preamble A to establish symbol synchronization; later processing is conducted at appropriate time.

Next, after a guard interval attached on a transmitting side is removed in the GI removing unit 45, signals are converted into parallel signals in the S/P converting unit 46 and inputted to the DFT unit 47. Then, the DFT unit 47 converts a received time domain signal into a frequency domain signal. The preambles B0 and B1 are simultaneously received, so that a frequency domain signal added with the preambles is inputted to the buffer unit 54. The inputted data is labeled RxB.

Next, the code selecting unit 55 selects a complex conjugate signal of the code B0 (a preamble transmitted from an antenna to which data is transmitted) and the code multiplying unit 48 multiplies the signal by R×B. The IDFT unit 49 performs an IDFT operation on the signal. The signal can be handled as a delay profile from an antenna that transmitted the preamble B0 (described below with reference to FIG. 4). Afterward, an output from the IDFT unit 49 of a receiving side and a time window are multiplied, the time window unit 50 removes unnecessary components to cut out noise and interference components, a desired delay profile is precisely gotten out to select valid information, and the DFT unit 51 performs DFT, such that a frequency response can be obtained. With the sought frequency response, subsequent data demodulation is possible. The data demodulating unit 53 corrects errors to obtain transmitted data.

Following the above sequence of processing or in parallel to the above sequence of processing, the code selecting unit 55 selects the code B1 and the code multiplying unit 48 multiplies the code by R×B. The result is subjected to IDFT in the IDFT unit 49, such that it is possible to seek a delay profile from an antenna that has transmitted preamble B1.

Figure 4:
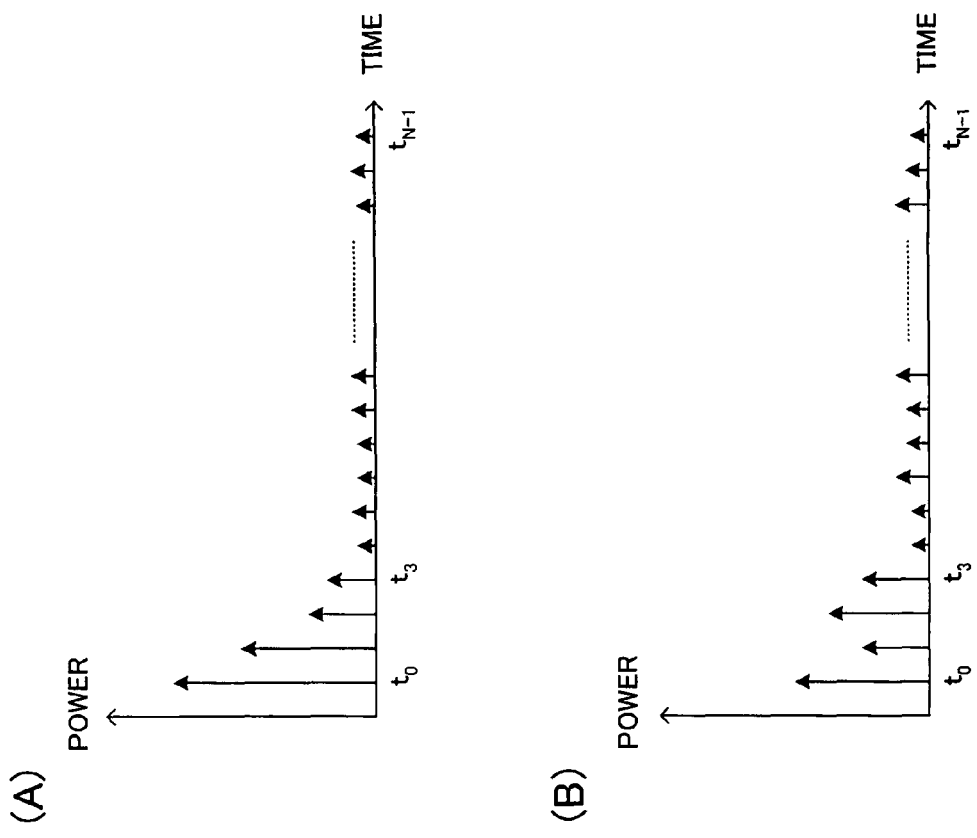
FIG. 4 is a diagram showing example of an output waveform from an IDFT unit.

FIG. 4 shows an example of a waveform outputted by the IDFT unit 49. FIG. 4 (*a*) is a diagram showing a waveform when B0 is used as a code, while FIG. 4 (*b*) is a diagram showing a waveform when B1 is used as a code. In the example shown in FIG. 4, delay profiles from both antennas spread from t0 to t3. When the code selecting unit 55 uses the code B0, influence of the preamble B1 spreads over all time waveforms. The influence can be handled as noise. On the contrary, when the code selecting unit 55 uses the code B1, influence of the preamble B0 spreads over all time waveforms. The influence can be handled as noise. That is, when a transmitting preamble series is same as a series used in a multiplying unit, power concentrates during a guard interval period and a delay profile is obtained. When a transmitting preamble series is different from a series used in a multiplying unit, power diffuses over all sampling time, producing a noisy signal.

In the example shown in FIG. 4, a time filter gets out only t0 to t3, so that a channel response can be estimated while influence of other preambles is kept to a minimum.

The power measuring unit 56 estimates power from the delay profiles and seeks which antenna has a propagation path with higher power. Then, the result is notified as antenna change information from a transmitter (not shown) to a base station. If a change is requested to use an antenna having a propagation path with higher power, the base station changes an antenna as described above for communication.

Figure 5:
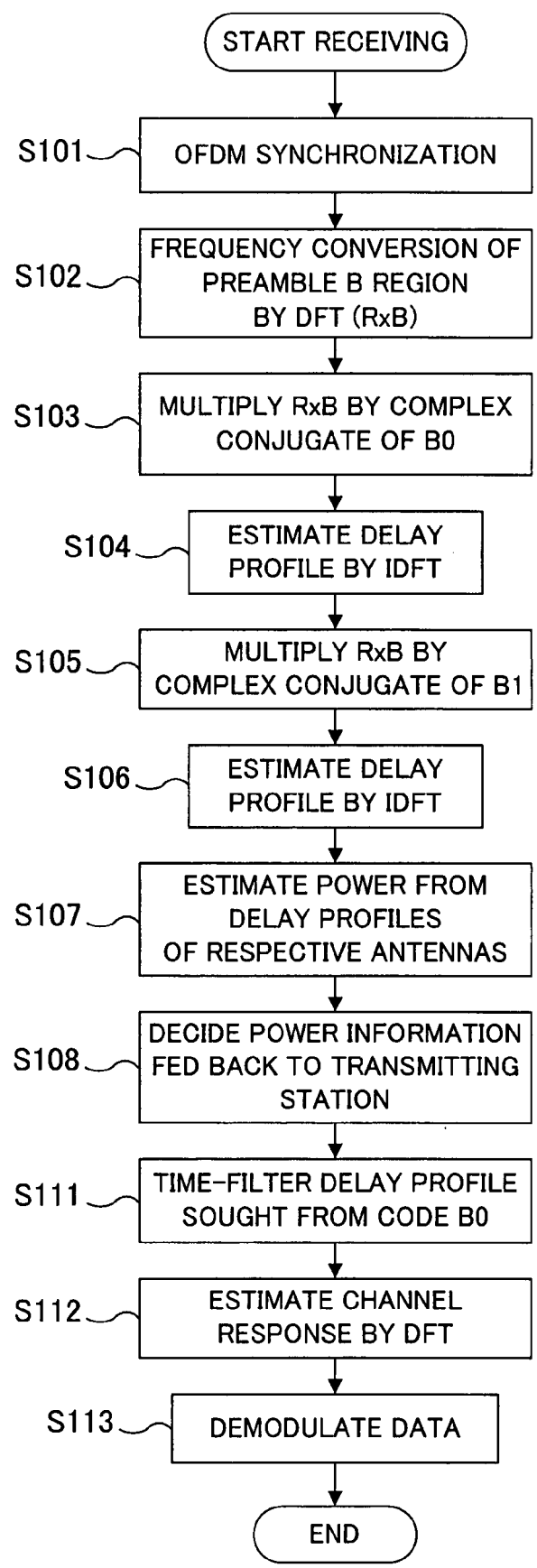
FIG. 5 is a flowchart showing the flow of a communicating method according to the first embodiment of the present invention.

FIG. 5 is a flowchart illustrating the above method. As shown in FIG. 5, when reception starts, first, OFDM symbol synchronization is performed using the preamble A at step S101. At step S102, a preamble region B (see FIG. 2; B0 and B1 are added in this embodiment) is converted into frequency data using DFT. Steps S103 to S106 are steps for estimating respective delay profiles from preambles used by antennas, using IDFT. First, R×B is multiplied by a complex conjugate of B0 and the delay profiles are estimated using IDFT at step S103, R×B is multiplied by a complex conjugate of B1 at step S105, and the delay profiles are estimated using IDFT at step S106. Step S107 is a step for estimating the power from the transmitting antennas from the delay profiles estimated at step S106. Step S108 is a step for deciding power information fed back to a transmitting side: a step for designating an antenna used in the next communication in this embodiment. At step S111, a time filter extracts valid data from a delay profile of an antenna used as a transmitting antenna, and at step S112, a channel response is estimated using DFT. Then, the data is demodulated at step S113 and the processing ends.

As described in the above, the preamble B1 to select an antenna is simultaneously transmitted for the preamble B0 needed to transmit data and the above device configuration and processing are accomplished, so that time to estimate an antenna is not further needed to configure a transmit diversity system. Additionally, according to the method, a code of an antenna for transmitting data is defined to be B0, so that even if there is no antenna selection information beforehand, a transmitting side can select an antenna arbitrarily.

Moreover, assuming that an antenna control system for a transmit diversity described herein is an antenna of each base station in a cellular system, it is possible to identify a base station. However, since a transmitting antenna of each base station transmits an OFDM symbol for estimating a channel response, which is modulated with a code specific to the antenna, codes of antennas are not replaced by each other like the transmitting device according to the first embodiment.

If a terminal is at a position to receive electric waves from a plurality of base stations (such as at a cell edge or at a sector edge), it receives OFDM signals for estimating channel responses, which are modulated with different codes and simultaneously transmitted. The terminal can identify the next base station to be connected by performing the processing described in the first embodiment when a signal from a current connected base station weakens or when the quality of a signal declines. However, it is not easy for a distant base station to completely synchronize to receive an OFDM signal for estimating a channel response. However, complete synchronization is not needed since a guard section is set for an OFDM signal, but the station only needs to synchronize to some extent to prevent a problem.

Although the example of two transmitting antennas has been described in relation to the first embodiment, the number of base stations from which simultaneous reception is possible is not limited to two in a cellular system. Moreover, codes used by the base stations are not known. In that case, a method of notifying information such as codes of surrounding base stations from a current connected base station is adopted. A terminal selects a code based on the information and selects the next base station to be connected.

Next, a radio communication technique according to a second embodiment of the present invention will be described with reference to the drawings. The radio communication technique according to this embodiment is an example in which the radio communication technique is applied to MIMO (Multi-Input Multi-Output; hereinafter, referred to as MIMO) using a plurality of transmitting/receiving antennas in communication.

Figure 6:
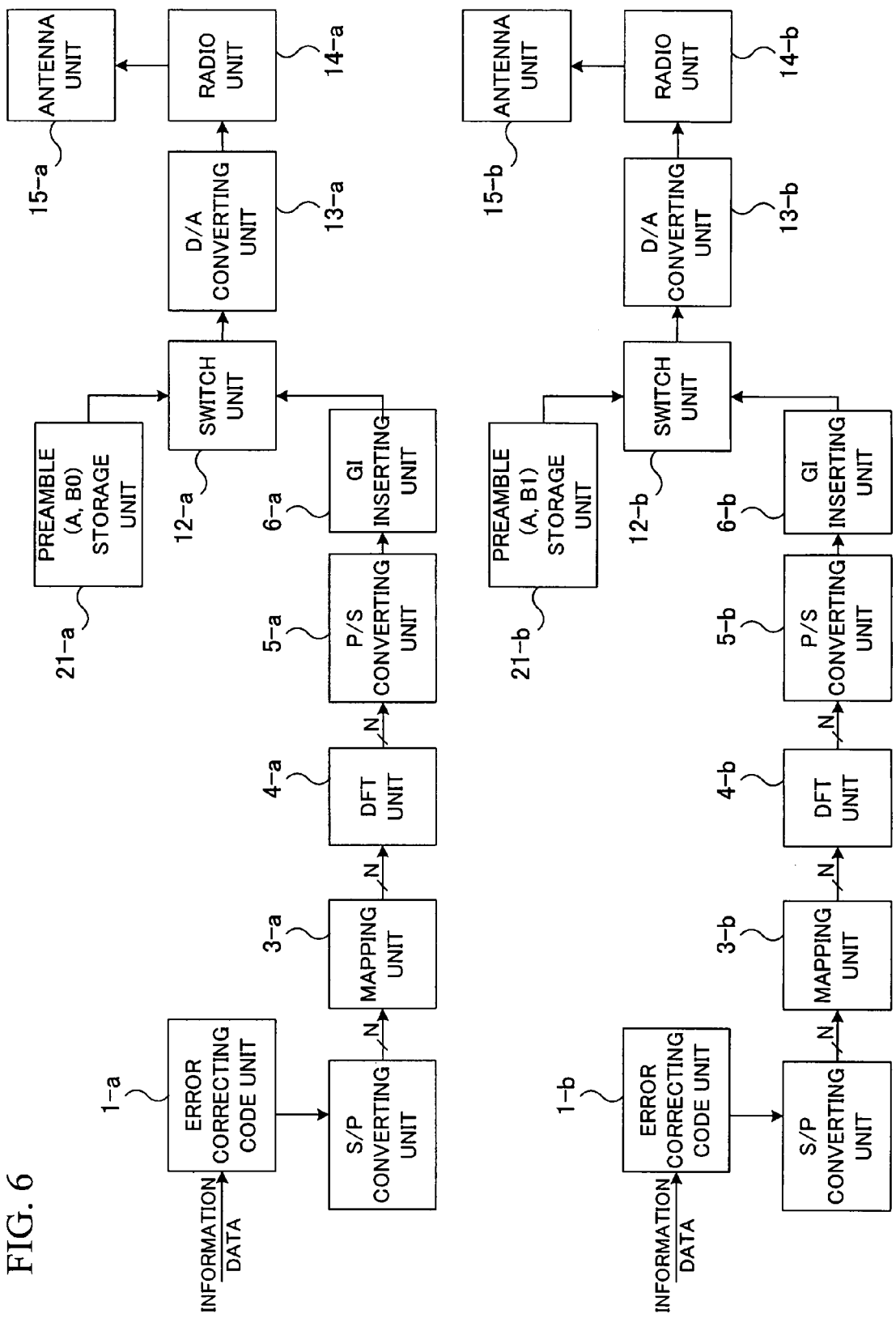
FIG. 6 is a diagram showing a configuration example of a transmitting device of a base station in examples of applying a radio communication technique to a MIMO using a plurality of transmitting/receiving antennas in communication using a radio communication technique according to a second embodiment of the present invention.

FIG. 6 is a diagram showing a configuration example of a transmitting device of a base station in a 2×2 (2: the number of transmitting antennas, 2: the number of receiving antennas) MIMO system according to this embodiment. Components labeled the same symbols as in FIG. 2 have the same functions, so they will not be described herein.

FIG. 6 differs from the configuration shown in FIG. 2 in that there are two lines for processing information data and the blocks 11 are replace by blocks 21. Information of channel responses between the antennas is always needed for all the antennas, so the antennas always transmit the same preambles. In this embodiment, the antenna 15-*a* certainly transmits the preamble B0 stored in the preamble (A, B0) storage unit 21-*a*, and so the antenna 15-*b* certainly transmits the preamble B1 stored in the preamble (A, B1) storage unit 21-*b*.

Figure 7:
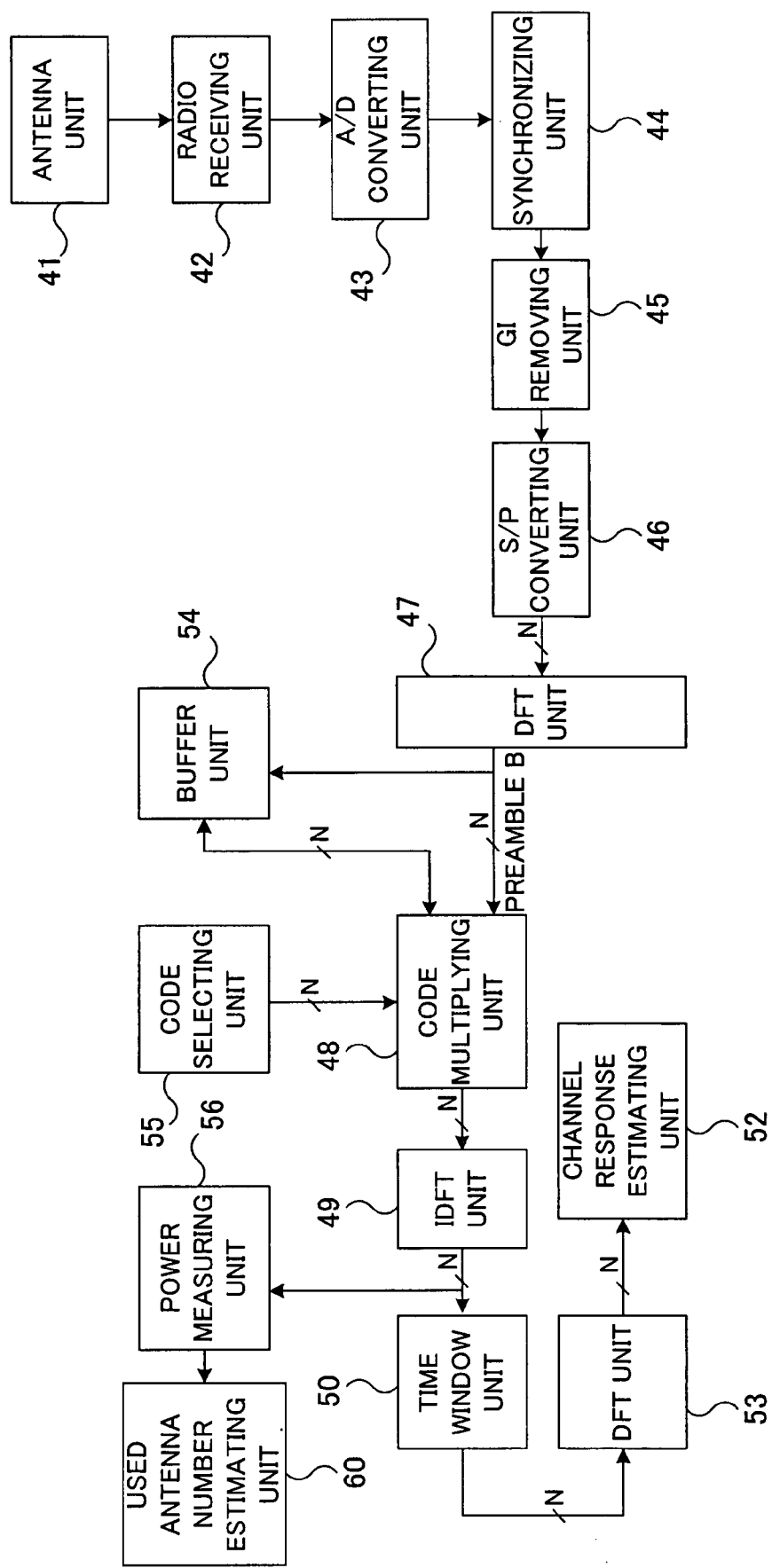
FIG. 7 is a functional block diagram showing a configuration example of a receiving device corresponding to FIG. 6.

FIG. 7 is a functional block diagram showing a configuration example of the receiving device according to this embodiment. However, FIG. 7 illustrates only a function to estimate a channel response; in order to realize MIMO, another same circuit configuration is needed, though the configuration is not illustrated. The same function blocks as in FIG. 3 are labeled the same numerals and will not be described herein since they hardly differ from the processing based on the configuration in FIG. 3. The differences in the processing are only that channel responses are always sought for all codes (B0, B1) and that the used antenna number estimating unit 60 is added.

In a MIMO system, a transmitting/receiving station must know the number of antennas in use. The radio communication technique according to this embodiment includes the used antenna estimating unit 60 shown in FIG. 7. If the measured power is not more than a pre-determined threshold based on the result of measuring power of each delay profile by the power measuring unit 56, then the used antenna estimating unit 60 can determine that an antenna using the preamble is not used to transmit data and can demodulate MIMO data.

As above, a receiving device can estimate the number of transmitting antennas using an OFDM symbol to estimate a channel response in a MIMO system. As such, an efficient communication system can be realized compared to a communication system which requires previous notification of the number of antennas to be used.

Figure 8:
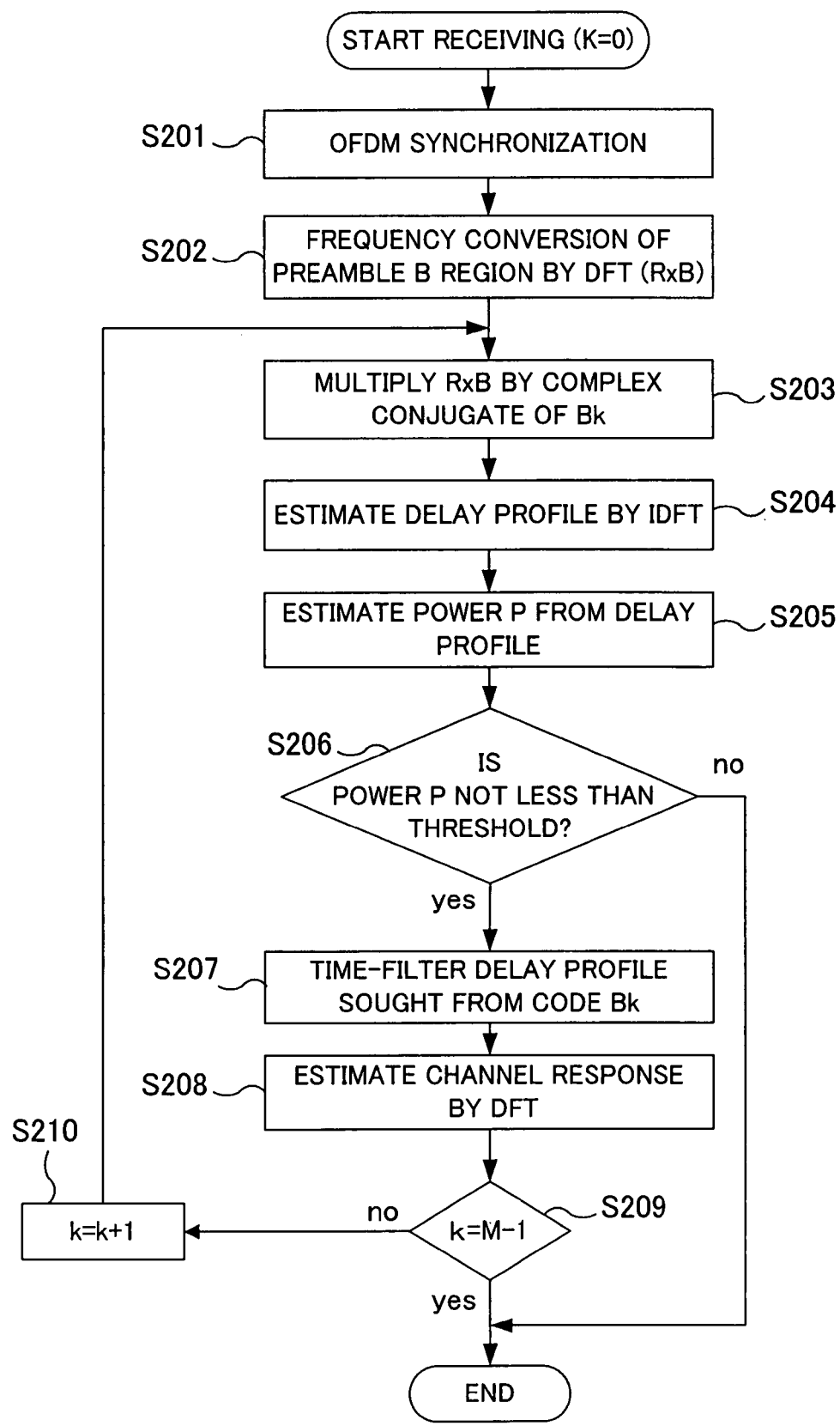
FIG. 8 is a flowchart showing the flow of channel response estimation processing according to the embodiment.

FIG. 8 is a flowchart showing the flow of channel response estimation processing according to this embodiment. As shown in FIG. 8, the flowchart according to this embodiment also shows only processing needed to estimate a channel response, meaning that the same processing is required for receiving systems of antenna. The flowchart illustrates a case that the number of transmitting antennas is M, wherein preambles B0, B1, . . . , BM-1 are preambles corresponding to respective transmitting antennas. If the number of antennas is decreased for each time of transmission, antennas in use are decreased in the order of antennas with larger suffix, i.e., BM-1, BM-2 . . .

When the reception starts (k=0), OFDM synchronization is performed at step S201, and then frequency conversion is performed for a region of a preamble B using DFT at step S202 (R×B). The processing in these steps is the same processing as S101 and S102, respectively. The R×B is multiplied by a complex conjugate of a code Bk (an integer being $0 \leq k < M$) at step S203, and then a delay profile is estimated using IDFT at step S204. Power P is estimated from the delay profile at step S205, and then it is determined whether or not the power is above a threshold at step S206. If the power is not above the threshold (no), the processing ends. If the power is above the threshold, a delay profile sought using the code Bk is time-filtered at step S207, and then a channel response is estimated using DFT at step S208. It is determined whether or not k equals M−1 at step S209. If it equals (yes), the processing ends. If it does not equal (no), k is incremented by one at step S210 and the processing returns to step S203, from which the processing repeats till the end of the processing.

With the above processing, it is possible to estimate antennas in use being not more than the total number of transmitting antennas. Further, a single OFDM symbol is enough to estimate channel responses among all the antennas.

The description of this embodiment does not describe antenna selection at a transmitting side. However, if a highly reliable antenna is picked up by priority at a transmitting side when an antenna is selected at a transmitting side, the antenna number selection method at the receiving side illustrated in the above flowchart works more effectively.

Though the above embodiment has been described as an example of a method of giving priorities of use to preambles, a method of checking all preambles is also possible.

If preambles are given the priorities of use, a transmitting and a receiving devices must keep the same priority beforehand; or this example cannot be realized. Therefore, a receiving device seeks power from delay profiles for all possible preambles and processes according to determination that data of only preambles whose power exceeds a threshold has been transmitted, so that the device can determine the number of antennas in a similar way.

Figure 9:
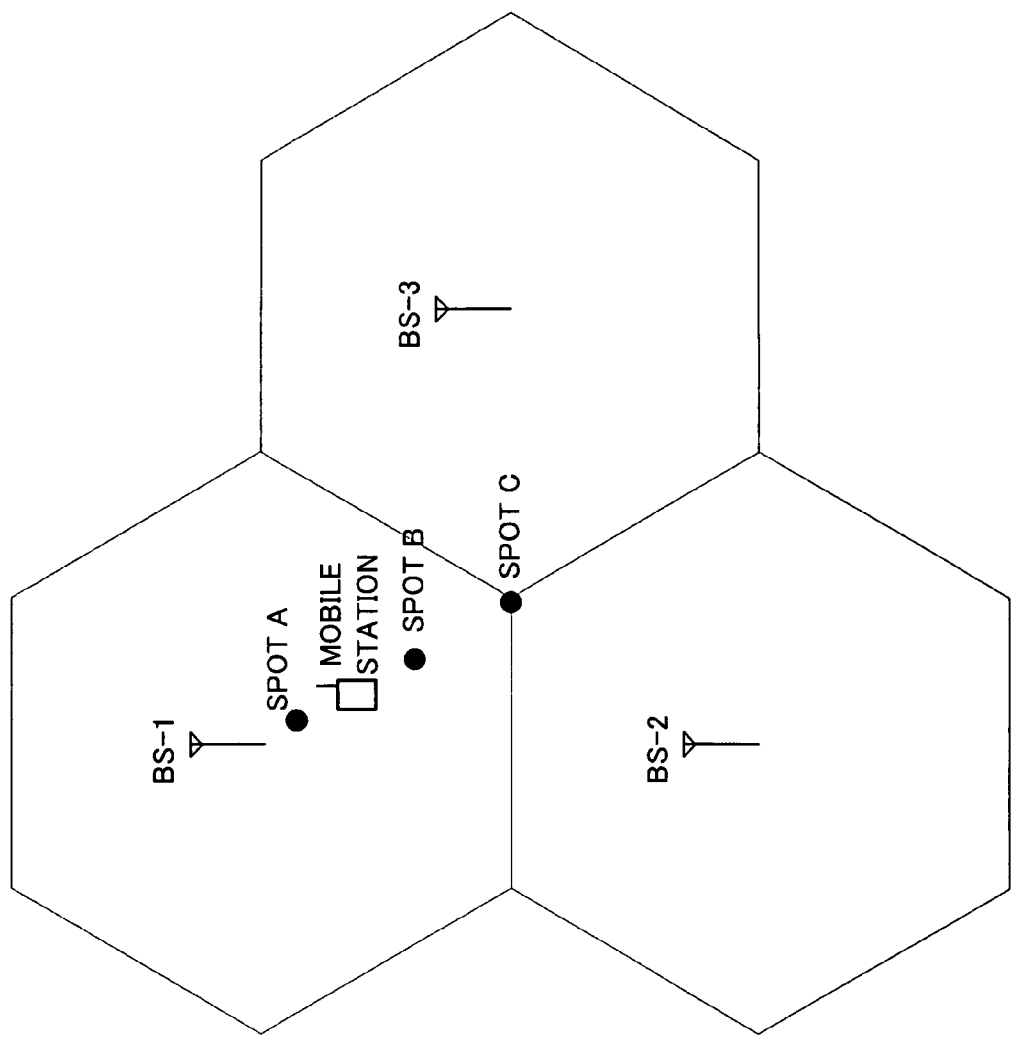
FIG. 9 is a diagram showing positional relation among devices in a radio communication technique according to a third embodiment of the present invention.

Next, a radio communication technique according to a third embodiment of the present invention will be described with reference to the drawings. The radio communication technique according to this embodiment is an example in which the present invention is applied to a base station constituting a cell. FIG. 9 is a diagram showing positional relation among devices in this embodiment. In a cell configuration example shown in FIG. 9, each base station forms a cell and uses an antenna for transmission and reception. A preamble B is generated according to a code specific to each base station. An example of the operation in a downstream channel from a base station to a mobile station will be described. As shown in FIG. 9, in the radio communication technique according to this embodiment, each of three cells is provided with one of base stations BS-1, BS-2 and BS-3 and the base stations BS-1, BS-2 and BS-3 use preambles B0, B1 and B2, respectively. A cell installed with the base station BS-1 is labeled a cell 1, a cell provided with the base station BS-2 is labeled a cell 2, and a cell provided with the BS-3 is labeled a cell 3. The base stations BS-1, BS-2 and BS-3 synchronize with one another in time and use the same frequency band for communication.

Figure 10:
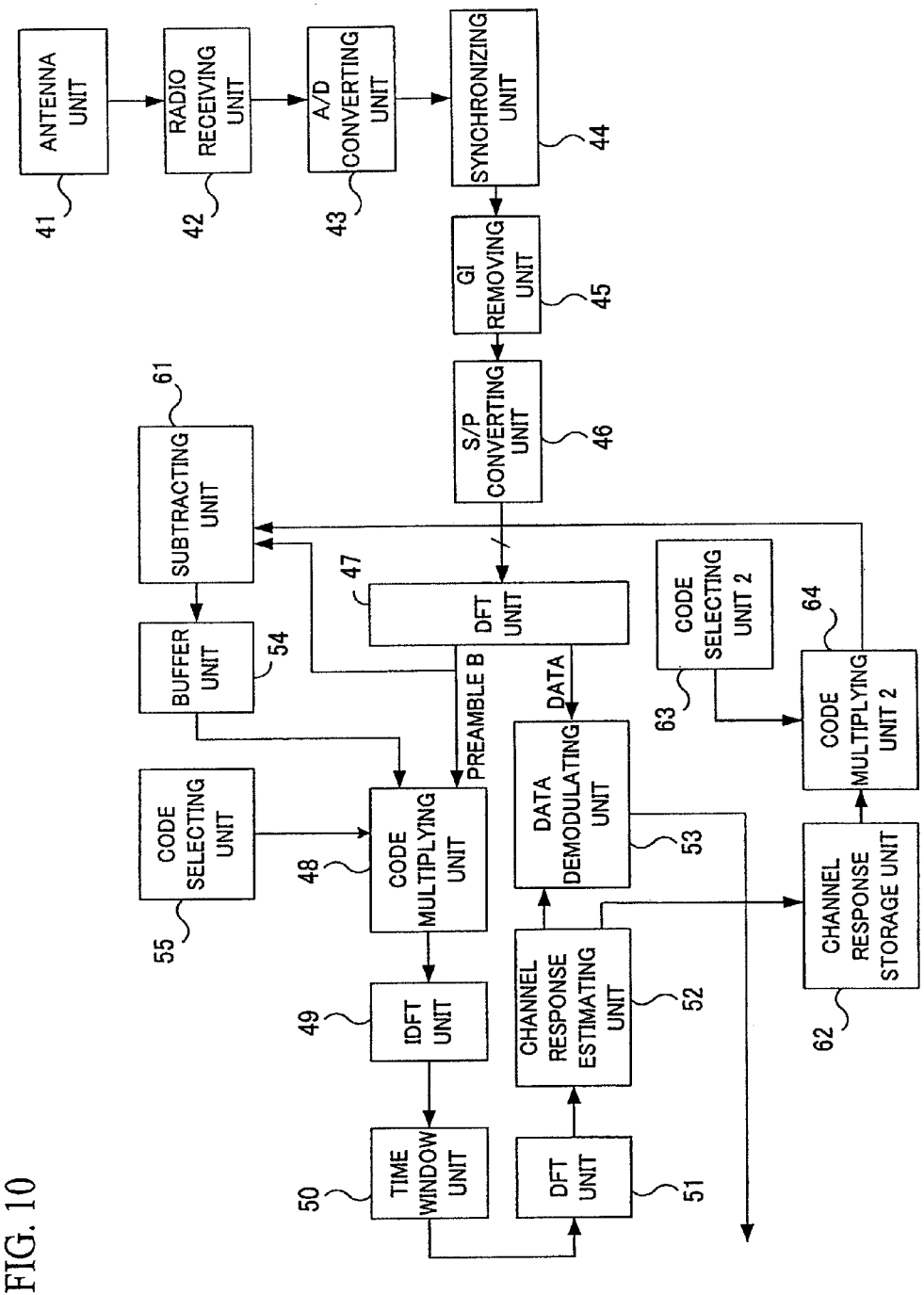
FIG. 10 is a functional block diagram showing a configuration example of a receiving device according to the third embodiment of the present invention.

FIG. 10 is a functional block diagram showing a configuration example of a receiving device according to this embodiment. The receiving device shown in FIG. 10 is configured to improve the accuracy of estimation of channel responses from the base stations. Though the above first and second embodiments can realize this configuration, the configuration is most effective when an antenna of a base station is selected. That is, in the first and second embodiments, the distances between a transmitting and a receiving devices are almost same, resulting in not so different received powers; however, when an antenna of a base station constituting a cell is selected, the distances between base stations and a mobile station differ from one another, resulting in quite different received powers. In that point, configuration according to this embodiment is effective. In FIG. 10, blocks labeled the same numerals as in FIG. 3 are the same function blocks as in FIG. 3 and will not be further described herein. In FIG. 10, a reference numeral 61 denotes a subtracting unit for performing subtraction on two signals for each frequency, a reference numeral 62 denotes a channel response storage unit, a reference numeral 63 denotes a code selecting unit (2) and a reference numeral 64 denotes a code multiplying unit (2). The units 63 and 64 have the same functions as the code selecting unit 55 and the code multiplying unit 48, respectively.

As shown in FIG. 9, when a mobile station is at a spot B (in the cell 1), it is near a desired base station BS-1 for transmitting and receiving a desired wave, so that it is possible to estimate a channel response accurately. However, the estimation of channel responses from interference base stations BS-2 and BS-3 for transmitting and receiving an interference wave results in low accuracy because the mobile station is remote from the interference base stations BS-2 and BS-3.

At the spot B, the mobile station knows a channel response from the base station BS-1 since the mobile station communicates with the base station BS-1. As such, in estimating a channel response from the base station BS-2, the accuracy of estimation of the channel response from the base station BS-2 can be improved by subtracting a preamble B0 component for the base station BS-1, from a received signal. A received signal of the preamble B0 transmitted from the base station BS-1 can be obtained by multiplying channel response information of the base station BS-1 stored in the channel response storage unit 62 by a code of the preamble B0 of the base station BS-1 selected by the code selecting unit (2) 64. The subtracting unit 61 performs an operation on a received signal with the preamble B0, so that it is possible to estimate a channel response from the base station BS-2 without the influence of the preamble B of the base station BS-1. Further, similar operation is repeated to estimate a channel response from the base station BS-3, and the channel response from the base station BS-3 can be estimated without influence of the base stations BS-1 and BS-2.

While channel responses are estimated from the base stations BS-1, BS-2 and BS-3 in that order in the above embodiment, estimation of channel responses cannot be in any order, but the estimation order resulting in higher performance is preferable. The order resulting in higher performance is the order of reliability in communication, by which, a channel response for a desired base station is sought, and then a channel response for a base station with a channel response considered to be highly reliable is sought in a normal state (when connected to a base station). At initial connection, channel responses for all connectable base stations are sought, and then channel responses are sought similarly from higher to lower reliability in communication.

A specific parameter indicating the reliability of communication used herein can simply be the received intensity, or can be SINR (Signal to Interference and Noise Power Ratio).

The above example has been described on the assumption that a mobile station knows a code of an interference wave beforehand. However, in many actual radio communication systems, there is a plurality of codes and a code of an interference wave is unknown. In the following, a flowchart is illustrated showing the flow of processing in such a case. In the processing, it is assumed that a mobile station is connected to a desired base station. A symbol Pinf in the flowchart is a power ratio when a delay profile is estimated using a certain code and is defined by an equation (3):

$$P_{inf} = \frac{\frac{1}{t_{guard}} \sum_{k=0}^{t_{guard}-1} Pt_k}{\frac{1}{N-t_{guard}} \sum_{k=t_{guard}}^{N-1} Pt_k} \quad (3)$$

wherein Ptk means power of the sought delay profile at time tk.

A threshold of Pinf is defined as 10×log Pinf>3 dB in the flowchart, which is only one example, and the threshold is not limited to 3 dB. A symbol tguard indicates a sample point equal to the length of a guard interval.

Figure 11:
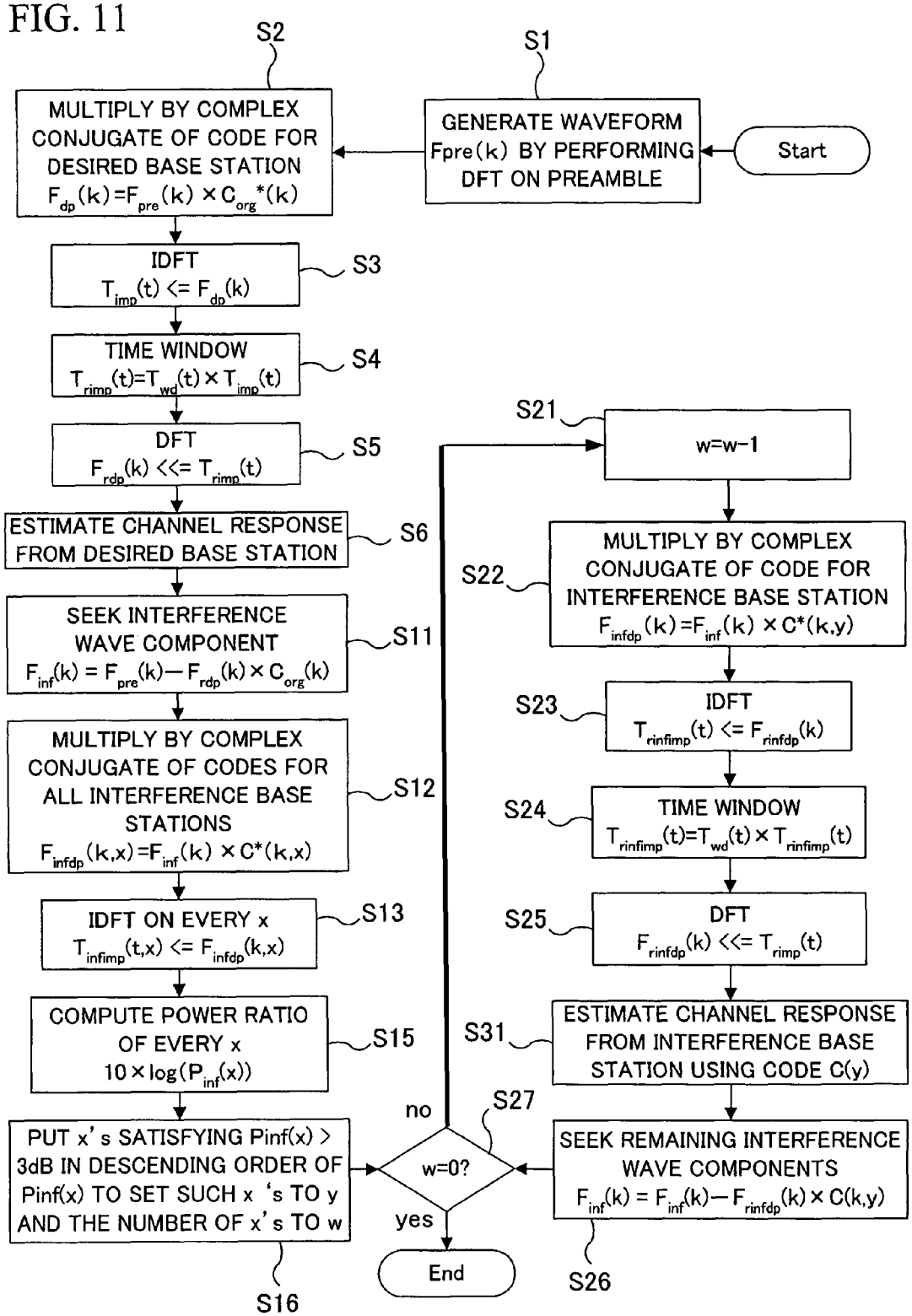
FIG. 11 is a flowchart showing the flow of signal processing by the receiving device shown in FIG. 10.

In FIG. 11, steps S1 to S6 are steps for estimating a channel response from a desired base station; steps S11 to S16 are steps for choosing a base station being an actual interference station and estimate the order of strength of electric waves; steps S21 to S26 are steps for estimating a channel response from the interference station; and step S31 is a step for retaining the channel response from the interference station in a memory or the like.

First, steps S1 to S6 will be described. Step S1 is a step for generating a waveform Fpre(k) as a result of performing DFT on a received preamble, wherein k is an integer satisfying 0≦k<N and is a subcarrier number.

Step S2 is a step for multiplying a signal sought at step S1 by Corg*(k) being a complex conjugate of Corg(k) being a desired base station specific code. As a result, the obtained signal is labeled Fdp(k). The Fdp(k) is a channel response from the desired base station containing many interference components.

At step S3, IDFT (the symbol "<=" in FIG. 11 means IDFT) is performed on Fdp(k) to seek Timp(t). A parameter t indicates a time sample for k and is an integer satisfying 0≦k<N. The Timp(t) is an impulse response from the desired base station.

At step S4, Timp(t) is multiplied by Twd(t) being a time window to calculate Trimp(t).

At step S5, DFT (the symbol "<<=" in FIG. 11 means DFT) is performed on Trimp(t) to seek Frdp(k). The Frdp(k) is a value obtained by accurately calculating the channel response from the desired base station. Then, at step S6, the estimated channel response is retained in a memory or the like for future use in demodulation processing (not shown).

Next, processing at steps S11 to S16 will be described. At step S11 following step S6, the channel response from the desired base station is subtracted from a waveform of the first sought preamble (see the equation in the drawing). In the calculation, a subtracted signal component is sought by multiplying Frdp(k) by a code specific to the desired base station. The signal sought at the step is a signal generated only from an interference signal and is defined as Finf(k).

Step S12 is a step for multiplying it by a conjugate of a code in order to seek channel responses for all codes of base station to be possibly interference. Herein, a code specific to a base station is represented by C(k, x) and a complex conjugate of the code is C*(k, x). An indicator x indicates a base station. For example, if there are ten codes, x is numbered from 0 to 9. A channel response is labeled Finfdp(k, x) from each interference base station sought at the step.

Step S13 is a step for performing IDFT on Finfdp(k, x) for every x. As a result, Tinfdp (t, x) is calculated. The Tinfdp (t, x) is a delay profile from each interference base station. At step S15, a power ratio Pinf (x) defined in the equation (3) is computed for every x. At step S16, x's are sought that satisfies Pinf(x)>3 dB and x's are sequenced in descending order of the magnitude of Pinf(x), the sequence is labeled "y". The number of x's satisfying the above condition equation is labeled "w". For example, if x is numbered from 0 to 9 as described before, there are three x's satisfying the condition equation, and the order of magnitude is x=3, x=1, x=2, then y equals 3, 1, 2 and w=3.

Finally, steps S21 to S27 will be described. Step S27 following step S16 is a step for determining whether or not a channel response of an interference wave has been estimated for every possible code. Step S21 is a step for decrementing w by one each time of a new loop. Step S22 is a step for seeking a channel response of an interference wave with likely maximum power among the interference waves remaining as interference wave components, in which the processing is same as in steps S2 and S12. As a result, a channel response of an interference wave can be estimated that has maximum power at that time.

Step S23 is a step for performing the same processing as at steps S3 and S13, or IDFT processing. Step S24 is a step for performing the same processing as at step S4, or for applying the time window. At step S25, the same processing is performed as at step S5, to identify a channel response for an interference base station having a code C(k, y). The path is stored at step S31. Step S26 is a step for removing the interference wave component and again execute the loop, the same processing as at step S11.

By executing the loop until w becomes 0, channel responses from all interference base stations can be estimated. Consequently, there is an advantage that data of an interference base station can be previously demodulated at handover, making the handover processing smooth.

Figure 12:
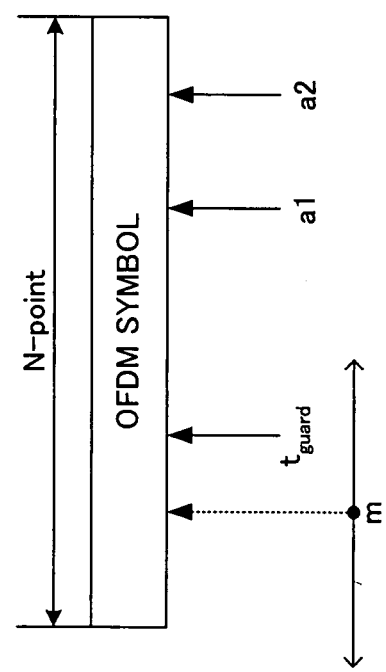
FIG. 12 is a diagram showing positional relation between an OFDM symbol and sample points.
Figure 13:
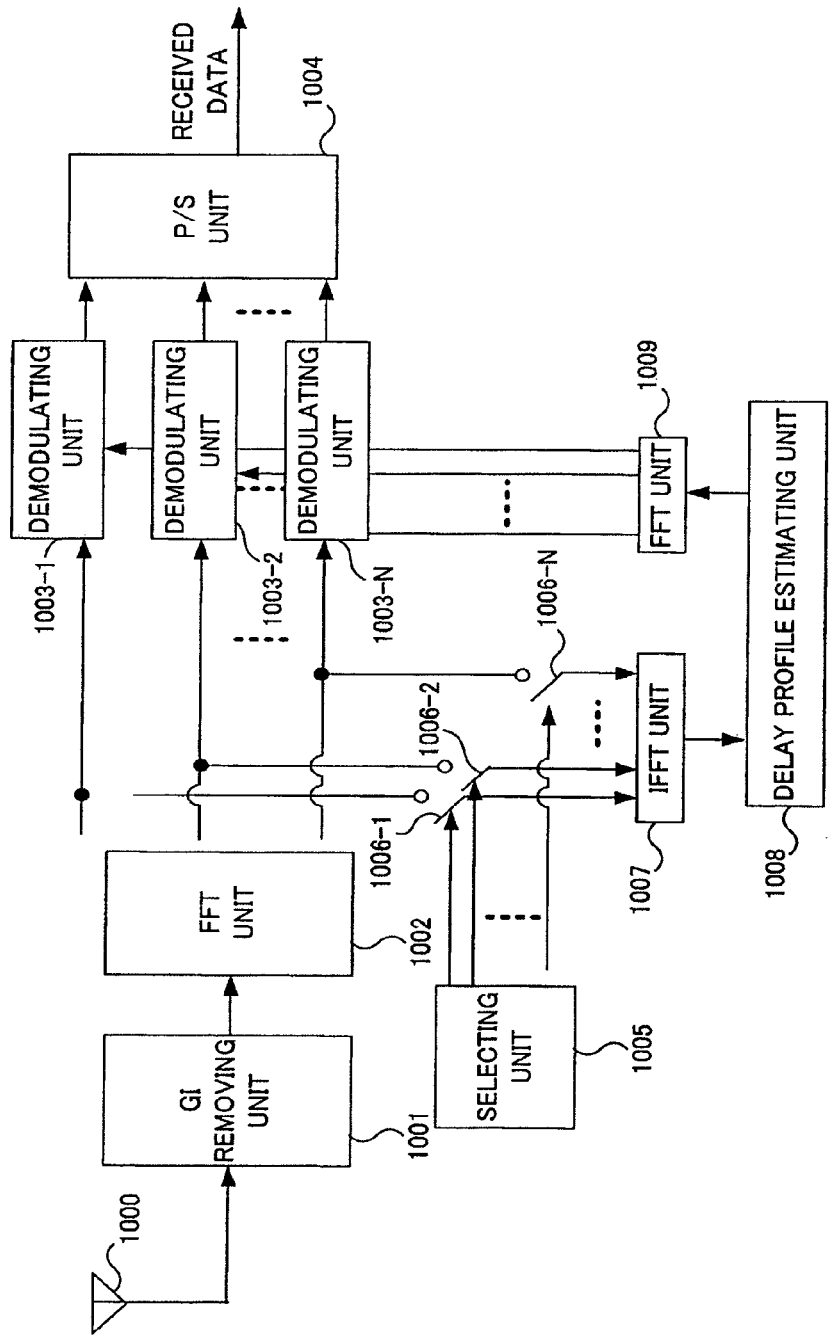
FIG. 13 is a diagram showing a device configuration example of a receiver described in the patent literature 1.

Next, a radio communication device according to a fourth embodiment of the present invention will be described with reference to the drawings. FIG. 12 is a diagram showing positional relation between an OFDM symbol and sample points.

This embodiment features a method of time filtering in the receiving device. The method illustrated herein is not only utilized for the radio communication techniques according to the above first to third embodiments, but also applicable to a general system for calculating a delay profile from a preamble using an antenna specific code to estimate a channel response.

In this embodiment, each base station forms a cell shown in FIG. 9, wherein an antenna performs transmission and reception. A preamble B is generated by a code specific to each base station. A downstream channel from a base station to a mobile station will be described as an example.

It is important for a receiving device of a mobile station used in the above system to accurately estimate a channel response. For this purpose, the time filtering function of the receiving function shown in FIG. 3 and other drawings increases in importance. Techniques of setting the filtering into the guard interval length have been used in the past. These techniques assume a broadcasting system, but are not always optimum in a system in which a receiving device moves in a cell.

The time filtering has a problem in which if the time for filtering is shorter, the components decreases that deteriorate with noises and the filtering performance improves, but when a signal component is removed, the accuracy of the estimation degrades. This embodiment involves methods of adaptively performing the time filtering.

With a first method, it is considered that there is a base station with various capabilities in a radio communication system with cell configuration; the base station notifies a mobile station of information of a cell area such as transmitting power; and the mobile station accordingly performs setting for the time filtering. According to the method, in communication with a base station constituting the radio communication system with a maximum cell area, the mobile station sets the time filtering into the guard interval length, shortening time for the time filtering for smaller cell areas.

With a second method, the time filtering length is changed depending on determination by the receiving device. It is important not to lose a signal from a desired base station as possible. For this purpose, a method is provided of broadening time window to a pre-determined level of a power ratio. Power of a k-th sample after IDFT is Ptk, and a ratio of sum of first to m-th powers to total power is Pr, then the equation is obtained:

$$Pr = \frac{\sum_{k=0}^{m-1} Pt_k}{\sum_{k=0}^{N-1} Pt_k} \quad (4)$$

It is proposed that the window width is broadened till Pr reaches a pre-determined power ratio. In that case, Pr of about 90% would be valid, but any value is not optimal. A method is proposed of setting the value in such a way to reduce influence from other cells and improve the accuracy of channel response estimation. For example, if a window is broadened to the width m satisfying Pr=90%, the estimation of the channel response is more accurate. However, such a window poses the case that m exceeds the guard interval length such as the case of a lot of noises, so a maximum value of m is set to the guard interval length to possibly prevent the accuracy from deteriorating.

It is also possible to approximate noise power at average power outside of the guard interval, subtract the result from a signal component, and then seek a power ratio. In that case, the equation (4) is modified as follows:

$$Pr' = \frac{\sum_{k=0}^{m-1} (Pt_k - P_{ave})}{\sum_{k=0}^{N-1} (Pt_k - P_{ave})} \quad (5)$$

and $$P_{ave} = \frac{1}{a2 - a1} \sum_{k=a1}^{a2} Pt_k \quad (6)$$

wherein tguard<a1<a2, the tguard is a sample point with the same length as the guard interval length. Handling the Pr' in a similar way to the above example improves the characteristics, whereby a maximum value does not need to be set.

INDUSTRIAL APPLICABILITY

The present invention is applicable to a radio communication system.

The invention claimed is:

1. An OFDM radio receiving device comprising:
   a first Fourier transform unit for performing a first Fourier transform on the received OFDM signals used for estimating channel responses, which are modulated with different codes depending on transmit antennas and simultaneously transmitted;
   a code selecting unit for selecting any of the codes used in a transmitting side;
   a code multiplying unit for multiplying said selected code by the first Fourier transform of the OFDM signal;
   an inverse Fourier transform unit for performing an inverse Fourier transform on a multiplication result;
   a time window unit for extracting only a necessary signal from a delay profile signal obtained by the inverse Fourier transform;
   a second Fourier transform unit for performing a second Fourier transform on an output of the time window unit; and
   a channel response estimating unit for estimating a channel response from a result of the second Fourier transform.

2. The OFDM radio receiving device according to claim 1 further comprising:
   a received power measuring unit for estimating received power from an antenna using the code selected in said code selecting unit, from the delay profile signal obtained by the inverse Fourier transform.

3. The OFDM receiving device according to claim 1 wherein said time window unit extracts only a sample corresponding to the length of time designated by the transmitting device.

4. The OFDM receiving device according to claim 1 wherein said time window unit extracts only a sample corresponding to the length of time previously registered in a terminal.

5. The OFDM receiving device according to claim 1 wherein time for said time window unit to extract the necessary sample is a pre-determined ratio of a value of the amplitude or power of delay profile integrated up to certain time to a value of its amplitude or power integrated across the whole section.

6. An OFDM receiving device for receiving OFDM signals used for estimating channel responses, which are modulated with different codes and simultaneously transmitted, the OFDM radio receiving device comprising:
 a first Fourier transform unit for performing a first Fourier transform on the received OFDM signals;
 a code selecting unit for selecting any of the codes used in a transmitting side;
 a code multiplying unit for multiplying said selected code by the first Fourier transform of the OFDM signal;
 an inverse Fourier transform unit for performing an inverse Fourier transform on a multiplication result;
 a time window unit for extracting only a necessary signal from a delay profile signal obtained by the inverse Fourier transform;
 a second Fourier transform unit for performing a second Fourier transform on an output of the time window unit; and
 a channel response estimating unit for estimating a channel response from a result of the second Fourier transform,
 wherein time for said time window unit to extract the necessary sample is a pre-determined ratio of a value of the amplitude or power of delay profile integrated up to certain time to a value of its amplitude or power integrated across the whole section, and
 wherein, a maximum value of the time to extract the sample is time represented by guard interval time used for an OFDM symbol in a data unit.

7. An OFDM radio transmitting device comprising a plurality of antennas, for transmitting data by switching the antennas depending on an antenna switching indication from a receiving device, wherein,
 a symbol to estimate a channel response transmitted from an antenna used to transmit data is identical irrespective to the selected antenna; and
 antennas not used for data transmission simultaneously transmit different patterns of symbols used for estimating channel responses.

8. An OFDM radio receiving device for receiving OFDM signals used for estimating channel responses, which are modulated with different codes and simultaneously transmitted, the OFDM radio receiving device comprising:
 a first Fourier transform unit for performing a first Fourier transform on the received OFDM signals;
 a code selecting unit for selecting any of the codes used in a transmitting side;
 a code multiplying unit for multiplying said selected code by the first Fourier transform of the OFDM signal;
 an inverse Fourier transform unit for performing an inverse Fourier transform on a multiplication result;
 a time window unit for extracting only a necessary signal from a delay profile signal obtained by the inverse Fourier transform;
 a second Fourier transform unit for performing a second Fourier transform on an output of the time window unit; and
 a channel response estimating unit for estimating a channel response from a result of the second Fourier transform,
 wherein the OFDM receiving device for receiving the signal from a OFDM transmitting device comprising a plurality of antennas, for transmitting data by switching the antennas depending on an antenna switching indication from a receiving device, and wherein,
 a symbol to estimate a channel response transmitted from an antenna used to transmit data is identical irrespective to the selected antenna,
 antennas not used for data transmission simultaneously transmit different patterns of symbols used for estimating channel responses, and
 a function to seek delay profiles or frequency responses for a plurality of series of codes specific to the transmitting antenna used in said radio transmitting device, and according to the result, select a desired transmitting antenna in said radio receiving device at receiving; and a function to indicate switching to the desired antenna if the result of said selection differs from a current used antenna.

9. A MIMO system that communicates with an OFDM radio receiving device, the OFDM radio receiving device receives OFDM signals used for estimating channel responses, which are modulated with different codes and simultaneously transmitted, wherein the OFDM radio receiving device comprises:
 a first Fourier transform unit for performing a first Fourier transform on the received OFDM signals,
 a code selecting unit for selecting any of the codes used in a transmitting side,
 a code multiplying unit for multiplying said selected code by the first Fourier transform of the OFDM signal,
 an inverse Fourier transform unit for performing an inverse Fourier transform on a multiplication result,
 a time window unit for extracting only a necessary signal from a delay profile signal obtained by the inverse Fourier transform,
 a second Fourier transform unit for performing a second Fourier transform on an output of the time window unit,
 a channel response estimating unit for estimating a channel response from a result of the second Fourier transform, and
 a transmitting antenna number estimating unit,
 the MIMO system comprising:
 a plurality of transmitting/receiving antennas,
 wherein the MIMO system uses specific series of codes as symbols used for estimating a channel response, for each transmitting antenna; and
 wherein the MIMO system receives signals by a plurality of antennas of the OFDM radio receiving device, and estimates channel responses of said transmitting antennas in said receiving antennas,
 wherein said transmitting antenna number estimating unit uses a result of seeking a delay profile using the pre-determined series of codes to estimate whether or not any antenna uses the pre-determined series of codes.

10. The MIMO system according to claim 9, wherein an estimating method for said transmitting antenna number estimating unit comprises:
 an estimating method of determining that tested series of codes are used if ratio of power from the head of the sought delay profile to time corresponding to a guard interval to power after the time corresponding to the guard interval is not less than a certain value.

11. A MIMO system that communicates with an OFDM radio receiving device, the OFDM radio receiving device receives OFDM signals used for estimating channel responses, which are modulated with different codes and simultaneously transmitted, wherein the OFDM radio receiving device comprises:
a first Fourier transform unit for performing a first Fourier transform on the received OFDM signals,
a code selecting unit for selecting any of the codes used in a transmitting side,
a code multiplying unit for multiplying said selected code by the first Fourier transform of the OFDM signal,
an inverse Fourier transform unit for performing an inverse Fourier transform on a multiplication result,
a time window unit for extracting only a necessary signal from a delay profile signal obtained by the inverse Fourier transform,
a second Fourier transform unit for performing a second Fourier transform on an output of the time window unit,
a channel response estimating unit for estimating a channel response from a result of the second Fourier transform, and
a transmitting antenna number estimating unit,
the MIMO system comprising:
a plurality of transmitting/receiving antennas,
wherein the MIMO system uses specific series of codes as symbols used for estimating a channel response, for each transmitting antenna; and
wherein the MIMO system receives signals by a plurality of antennas of the OFDM radio receiving device, and estimates channel responses of said transmitting antennas in said receiving antennas,
wherein said transmitting antenna number estimating unit gives priority to series of codes used specifically to each antenna in a transmitting side; and a receiving side uses series of coincidence in order of the priority to determine whether or not there is a transmitting antenna, and decides the number of antennas before a series code to be determined that there is no transmitting antenna, as the current number of transmitting antennas.

12. A radio receiving device for receiving a signal, the radio receiving device comprising:
a receiving unit receiving a signal used for estimating a channel response, which is generated by different codes and simultaneously transmitted from different antennas;
a determining unit determining a plurality of codes from said received signal;
a delay profile determining unit generating a plurality of delay profiles using the plurality of codes;
a time processing unit separating the obtained delay profiles by time processing; and
an estimation unit estimating channel responses based on the output of the time processing unit.

13. A radio receiving device for receiving a signal used for estimating a channel response for an OFDM system generated by different codes, simultaneously transmitted from different antennas, the radio receiving device comprising:
a receiving unit receiving a signal;
a determining unit determining a plurality of codes from said received signal;
a delay profile determining unit generating a plurality of delay profiles using the plurality of codes;
a time processing unit separating the obtained delay profiles by time processing;
an estimation unit estimating channel responses based on the output of the time processing unit; and
an identifying unit for identifying other series of codes in use among signals received in addition to signals from a radio transmitting station using a certain series of codes; creating a replica of a received signal using the other series of codes identified using said identifying unit; and using a signal in which said replica is subtracted from the received signal to result, to seek a channel response from the radio transmitting station using the certain series of codes.

14. The radio receiving device according to claim 13, wherein in creating the replica of a received interference wave other than a desired received wave using the certain series of codes and subtracting the replica from the received wave, a criterion for selecting the received interference wave being a target of the creation of said replica is that the certainty of reliability information of said target received interference wave is high.

15. The radio receiving device according to claim 13, wherein performing processing on all received interference waves to be targets of replica creation, the processing comprising:
in subtracting replicas of the other plurality of received interference waves other than the desired received wave from the radio transmitting station using the certain series of codes from the received wave, first selecting only a received interference wave with the most certain reliability information among the other plurality of received interference waves to create the replica and subtracting the replica from the received wave; and
then, selecting a received interference wave with the most certain reliability information among remaining received interference waves to create a replica and further subtracting the replica from the received wave from which said replica has been subtracted.

16. The radio receiving device according to claim 14, wherein said reliability information is the amount of power or Signal to Interference and Noise power Ratio or Signal to Noise power Ratio.

17. An OFDM radio receiving device comprising:
a Fourier transform unit for performing a Fourier transform on the received OFDM signals used for estimating channel responses, which are modulated with different codes depending on transmit antennas;
a code selecting unit for selecting any code corresponding to codes used in a transmitting side;
a code multiplying unit for multiplying the selected code by a resultant signal by the Fourier transform of the OFDM signals used for estimating channel responses; and
a channel response estimating unit for estimating a channel response based on a result of the multiplication.

18. An OFDM radio receiving device for receiving signals, the OFDM radio receiving device comprising:
a delay profile generating unit generating a delay profile by selecting one code from different codes which are used to generate received signals transmitted from different antennas;
a time processing unit separating the obtained delay profile by time processing; and
a frequency response calculating unit calculating a frequency response of a channel from a transmitting antenna using the selected code.

19. The OFDM radio receiving device according to claim 18, further comprising:
a received power measuring unit for estimating, from the delay profile, received power from the transmitting antenna using the selected code.

20. A communication method for estimating channel responses from received OFDM signals, the communication method comprising the steps of:
performing a Fourier transform on the received OFDM signals which are modulated with different codes depending on transmit antennas;
selecting any code corresponding to codes used in a transmitting side;
multiplying the selected code by a resultant signal by the Fourier transform of the OFDM signals used for estimating channel responses; and
estimating a channel response based on a result of the multiplication.

21. A communication method for estimating channel responses from received signals, the communication method comprising the steps of:
generating a delay profile by selecting one code from codes corresponding to the different codes which are used to generate received signals transmitted from different antennas;
separating the obtained delay profile by time processing; and
calculating a frequency response of a channel from a transmitting antenna using the selected code.

22. The communication method according to claim 21, further comprising the step of:
estimating, from the delay profile, received power from the transmitting antenna using the selected code.

23. An OFDM radio receiving device comprising:
a Fourier transform unit for performing a Fourier transform on the received OFDM signals used for estimating channel responses, which are modulated with different codes depending on transmit antennas and simultaneously transmitted;
a code selecting unit for selecting any of the codes used in a transmitting side;
a code multiplying unit for multiplying said selected code by the Fourier transform of the OFDM signal;
an inverse Fourier transform unit for performing an inverse Fourier transform on a multiplication result;
a time window unit for extracting only a necessary signal from a delay profile signal obtained by the inverse Fourier transform;
the Fourier transform unit for performing a Fourier transform on an output of the time window unit; and
a channel response estimating unit for estimating a channel response from a result of the Fourier transform on the output of the time window unit.

* * * * *